(12) United States Patent
Ambrosio et al.

(10) Patent No.: US 8,818,588 B2
(45) Date of Patent: Aug. 26, 2014

(54) PARALLEL HYBRID DRIVE SYSTEM UTILIZING POWER TAKE OFF CONNECTION AS TRANSFER FOR A SECONDARY ENERGY SOURCE

(75) Inventors: Joseph Mario Ambrosio, Smithtown, NY (US); Joseph Dalum, Delafield, WI (US)

(73) Assignee: Odyne Systems, LLC, Waukesha, WI (US)

(*) Notice: Subject to any disclaimer, the term of this patent is extended or adjusted under 35 U.S.C. 154(b) by 576 days.

(21) Appl. No.: 12/217,407

(22) Filed: Jul. 3, 2008

(65) Prior Publication Data

US 2009/0018716 A1  Jan. 15, 2009

Related U.S. Application Data

(60) Provisional application No. 60/959,181, filed on Jul. 12, 2007, provisional application No. 61/126,118, filed on May 1, 2008.

(51) Int. Cl.
*B60K 6/20* (2007.10)
*B60K 17/28* (2006.01)
*G06F 17/00* (2006.01)

(52) U.S. Cl.
USPC .......... 701/22; 903/904; 180/65.21; 74/15.66

(58) Field of Classification Search
USPC .......... 701/22; 180/65.23, 243, 65.265, 65.22, 180/65.21; 60/327, 413; 903/902, 904, 906, 903/907; 74/15.66
See application file for complete search history.

(56) References Cited

U.S. PATENT DOCUMENTS

| | | |
|---|---|---|
| 2,581,010 A | 1/1952 | Findley et al. |
| 2,968,915 A | 1/1961 | Feistel, Jr. |
| 3,299,983 A | 1/1967 | Hubbard |
| 3,923,115 A | 12/1975 | Helling |
| 4,443,752 A | 4/1984 | Newman |
| 4,918,690 A | 4/1990 | Markkula, Jr. et al. |
| 4,941,143 A | 7/1990 | Twitty et al. |
| 4,948,050 A | 8/1990 | Picot |
| 4,955,018 A | 9/1990 | Twitty et al. |
| 4,959,962 A | 10/1990 | Hagin et al. |
| 4,962,462 A | 10/1990 | Fekete |
| 4,969,147 A | 11/1990 | Markkula, Jr. et al. |

(Continued)

FOREIGN PATENT DOCUMENTS

| | | |
|---|---|---|
| CN | 1647968 | 8/2005 |
| CN | 101011964 | 8/2007 |

(Continued)

OTHER PUBLICATIONS

Office Action for U.S. Appl. No. 11/329,018, mail date Oct. 14, 2008, 12 pages.

(Continued)

*Primary Examiner* — Tuan C. To
(74) *Attorney, Agent, or Firm* — Foley & Lardner LLP

(57) ABSTRACT

A parallel hybrid vehicle system utilizing the Power Take Off connection on an automatic transmission as a transfer port for a secondary device is described for both driving modes and stationary operation. The secondary device is a battery powered electric motor providing motive power or regenerative braking in driving mode or providing power to accessories typically mounted to a conventional PTO while stationary.

24 Claims, 8 Drawing Sheets

(56) References Cited

U.S. PATENT DOCUMENTS

| | | | | |
|---|---|---|---|---|
| 4,993,780 | A | 2/1991 | Tanaka et al. | |
| 5,190,118 | A | 3/1993 | Yelton | |
| 5,195,600 | A | 3/1993 | Dorgan | |
| 5,242,278 | A | 9/1993 | Vanderslice et al. | |
| 5,297,143 | A | 3/1994 | Fridrich et al. | |
| 5,315,227 | A | 5/1994 | Pierson et al. | |
| 5,318,142 | A | 6/1994 | Bates et al. | |
| 5,319,641 | A | 6/1994 | Fridrich et al. | |
| 5,366,827 | A | 11/1994 | Belanger et al. | |
| 5,373,198 | A | 12/1994 | Lopez Jimenez | |
| 5,394,089 | A | 2/1995 | Clegg | |
| 5,420,572 | A | 5/1995 | Dolin, Jr. et al. | |
| 5,492,189 | A | 2/1996 | Kriegler et al. | |
| 5,495,912 | A | 3/1996 | Gray, Jr. et al. | |
| 5,500,852 | A | 3/1996 | Riley | |
| 5,513,324 | A | 4/1996 | Dolin, Jr. et al. | |
| 5,519,878 | A | 5/1996 | Dolin, Jr. | |
| 5,558,588 | A | 9/1996 | Schmidt | |
| 5,568,037 | A | 10/1996 | Massaroni et al. | |
| 5,569,552 | A | 10/1996 | Rao et al. | |
| 5,620,057 | A | 4/1997 | Klemen et al. | |
| 5,625,272 | A | 4/1997 | Takahashi | |
| 5,635,805 | A | 6/1997 | Ibaraki et al. | |
| 5,669,842 | A | * 9/1997 | Schmidt | 475/5 |
| 5,701,068 | A | 12/1997 | Baer et al. | |
| 5,866,276 | A | 2/1999 | Ogami et al. | |
| 5,867,009 | A | 2/1999 | Kiuchi et al. | |
| 5,887,674 | A | 3/1999 | Gray, Jr. | |
| 5,923,093 | A | 7/1999 | Tabata et al. | |
| 5,985,483 | A | 11/1999 | Verhoog et al. | |
| 6,037,749 | A | 3/2000 | Parsonage | |
| 6,042,961 | A | 3/2000 | Verhoog et al. | |
| 6,048,288 | A | 4/2000 | Tsujii et al. | |
| 6,057,050 | A | 5/2000 | Parise | |
| 6,165,102 | A | 12/2000 | Bellinger | |
| 6,198,387 | B1 | 3/2001 | Dalum et al. | |
| 6,220,733 | B1 | 4/2001 | Gordon | |
| 6,251,042 | B1 | 6/2001 | Peterson et al. | |
| 6,269,895 | B1 | 8/2001 | Tanuguchi et al. | |
| 6,316,841 | B1 | 11/2001 | Weber | |
| 6,395,417 | B1 | 5/2002 | Frazier | |
| 6,456,041 | B1 | 9/2002 | Terada et al. | |
| 6,484,830 | B1 | 11/2002 | Gruenwald et al. | |
| 6,502,393 | B1 | 1/2003 | Stephenson et al. | |
| 6,511,399 | B2 | 1/2003 | Mc Collum et al. | |
| 6,524,084 | B2 | 2/2003 | Neumair | |
| 6,524,743 | B2 | 2/2003 | Vackar | |
| 6,590,363 | B2 | 7/2003 | Teramoto | |
| 6,598,496 | B2 | 7/2003 | Pannell | |
| 6,617,826 | B2 | 9/2003 | Liao et al. | |
| 6,651,759 | B1 | 11/2003 | Gruenwald et al. | |
| 6,653,002 | B1 | 11/2003 | Parise | |
| 6,658,852 | B2 | 12/2003 | Frey | |
| 6,666,022 | B1 | 12/2003 | Yoshimatsu et al. | |
| 6,692,395 | B2 | 2/2004 | Rodeghiero et al. | |
| 6,705,416 | B1 | 3/2004 | Gionner et al. | |
| 6,708,787 | B2 | 3/2004 | Naruse et al. | |
| 6,718,782 | B2 | 4/2004 | Egami | |
| 6,719,080 | B1 | 4/2004 | Gray, Jr. | |
| 6,725,581 | B2 | 4/2004 | Naruse et al. | |
| 6,751,960 | B2 | * 6/2004 | Arimitsu et al. | 60/706 |
| 6,834,737 | B2 | 12/2004 | Bloxham | |
| 6,880,651 | B2 | 4/2005 | Loh et al. | |
| 6,882,129 | B2 | 4/2005 | Boskovitch et al. | |
| 6,885,920 | B2 | 4/2005 | Yakes et al. | |
| 6,922,990 | B2 | 8/2005 | Naruse et al. | |
| 6,945,039 | B2 | 9/2005 | Yoshino | |
| 6,945,893 | B2 | 9/2005 | Grillo et al. | |
| 7,004,273 | B1 | 2/2006 | Guenwald et al. | |
| 7,017,348 | B2 | * 3/2006 | Tajima et al. | 60/706 |
| 7,086,226 | B2 | 8/2006 | Oguri | |
| 7,096,985 | B2 | 8/2006 | Charaudeau et al. | |
| 7,104,920 | B2 | 9/2006 | Beaty et al. | |
| 7,119,454 | B1 | 10/2006 | Chiao | |
| 7,125,357 | B2 | * 10/2006 | Porter | 475/5 |
| 7,147,071 | B2 | 12/2006 | Gering et al. | |
| 7,182,583 | B2 | 2/2007 | Gandrud et al. | |
| 7,185,722 | B1 | 3/2007 | Sakamoto et al. | |
| 7,190,133 | B2 | 3/2007 | King et al. | |
| 7,219,000 | B2 | * 5/2007 | Steinmetz et al. | 701/51 |
| 7,251,265 | B2 | 7/2007 | Yakymyshyn et al. | |
| 7,252,165 | B1 | 8/2007 | Gruenwald et al. | |
| 7,258,183 | B2 | 8/2007 | Leonardi et al. | |
| 7,273,122 | B2 | 9/2007 | Rose | |
| 7,275,917 | B1 | 10/2007 | Hicks | |
| 7,277,782 | B2 | 10/2007 | Yakes et al. | |
| 7,293,621 | B2 | 11/2007 | Long | |
| 7,298,102 | B2 | 11/2007 | Sopko et al. | |
| 7,315,090 | B2 | * 1/2008 | Yang | 290/40 C |
| 7,345,441 | B2 | 3/2008 | Yoshimatsu | |
| 7,375,492 | B2 | 5/2008 | Calhoon et al. | |
| 7,391,129 | B2 | 6/2008 | Chiao et al. | |
| 7,427,156 | B2 | 9/2008 | Ambrosio et al. | |
| 7,448,981 | B2 | * 11/2008 | Mashiki | 477/3 |
| 7,471,066 | B2 | 12/2008 | Ambrosio et al. | |
| 7,520,354 | B2 | * 4/2009 | Morrow et al. | 180/65.31 |
| 7,575,287 | B2 | 8/2009 | Matsuura et al. | |
| 7,597,172 | B1 | * 10/2009 | Kovach et al. | 180/305 |
| 7,600,595 | B2 | * 10/2009 | Harris | 180/65.31 |
| 7,610,976 | B2 | * 11/2009 | Holmes et al. | 180/65.29 |
| 7,641,018 | B2 | 1/2010 | Bissontz | |
| 7,657,350 | B2 | 2/2010 | Moran | |
| 7,658,250 | B2 | 2/2010 | Betz et al. | |
| 7,662,062 | B2 | 2/2010 | Yang | |
| 7,665,559 | B2 | 2/2010 | De La Torre-Bueno | |
| 7,669,414 | B2 | * 3/2010 | Loeffler | 60/414 |
| 7,806,801 | B2 | 10/2010 | Gohring et al. | |
| 7,841,432 | B2 | 11/2010 | Lynn et al. | |
| 7,854,282 | B2 | 12/2010 | Lee et al. | |
| 7,859,202 | B2 | 12/2010 | Lukic et al. | |
| 7,921,950 | B2 | * 4/2011 | Harris | 180/65.6 |
| 7,994,221 | B2 | 8/2011 | Dai et al. | |
| 8,275,528 | B2 | 9/2012 | Kresse | |
| 2001/0035740 | A1 | 11/2001 | Palanisamy | |
| 2002/0028376 | A1 | 3/2002 | Yamane et al. | |
| 2002/0104300 | A1 | * 8/2002 | Hunt | 56/10.6 |
| 2002/0108794 | A1 | 8/2002 | Wakashiro et al. | |
| 2003/0062205 | A1 | 4/2003 | Konrad et al. | |
| 2003/0103850 | A1 | 6/2003 | Szulczewski | |
| 2003/0145666 | A1 | * 8/2003 | Warner | 74/11 |
| 2003/0169002 | A1 | * 9/2003 | Hughes | 318/376 |
| 2004/0108831 | A1 | 6/2004 | Cartwright et al. | |
| 2004/0207205 | A1 | * 10/2004 | Kikuchi et al. | 290/40 C |
| 2004/0207350 | A1 | 10/2004 | Wilton et al. | |
| 2004/0251065 | A1 | * 12/2004 | Komiyama et al. | 180/65.4 |
| 2005/0012337 | A1 | 1/2005 | Yoshimatsu | |
| 2005/0082098 | A1 | * 4/2005 | Ito et al. | 180/65.2 |
| 2005/0139399 | A1 | 6/2005 | Gopal | |
| 2005/0167169 | A1 | 8/2005 | Gering et al. | |
| 2005/0202315 | A1 | 9/2005 | Sugeno et al. | |
| 2005/0271934 | A1 | 12/2005 | Kiger et al. | |
| 2006/0052215 | A1 | * 3/2006 | Beaty et al. | 477/5 |
| 2006/0068970 | A1 | 3/2006 | Rose | |
| 2006/0116797 | A1 | 6/2006 | Moran | |
| 2006/0148607 | A1 | * 7/2006 | Rodeghiero et al. | 475/83 |
| 2007/0001616 | A1 | 1/2007 | Puccetti et al. | |
| 2007/0095587 | A1 | 5/2007 | DuCharme | |
| 2007/0096667 | A1 | 5/2007 | Komiyama et al. | |
| 2007/0124037 | A1 | 5/2007 | Moran | |
| 2007/0158118 | A1 | 7/2007 | King | |
| 2007/0209850 | A1 | 9/2007 | Bloomfield | |
| 2007/0227801 | A1 | 10/2007 | Loeffler | |
| 2007/0278022 | A1 | * 12/2007 | Tanishima | 180/65.2 |
| 2008/0093143 | A1 | 4/2008 | Harrison | |
| 2008/0093864 | A1 | 4/2008 | Kagoshima et al. | |
| 2008/0141800 | A1 | 6/2008 | Seitz et al. | |
| 2008/0234097 | A1 | * 9/2008 | Sah | 477/3 |
| 2008/0288132 | A1 | 11/2008 | King et al. | |
| 2009/0018716 | A1 | 1/2009 | Ambrosio | |
| 2009/0068547 | A1 | 3/2009 | Ambrosio et al. | |
| 2009/0095549 | A1 | * 4/2009 | Dalum et al. | 180/65.265 |
| 2009/0096424 | A1 | 4/2009 | Ambrosio et al. | |
| 2009/0236156 | A1 | 9/2009 | Promersberger et al. | |
| 2009/0259355 | A1 | 10/2009 | Li | |

(56) References Cited

U.S. PATENT DOCUMENTS

| | | | |
|---|---|---|---|
| 2009/0259363 | A1 | 10/2009 | Li |
| 2010/0219007 | A1 | 9/2010 | Dalum et al. |
| 2011/0022259 | A1 | 1/2011 | Niwa |
| 2011/0190968 | A1 | 8/2011 | Fleming et al. |

FOREIGN PATENT DOCUMENTS

| | | | |
|---|---|---|---|
| DE | 27 01 301 | | 7/1978 |
| DE | 40 24 384 | A1 | 2/1992 |
| DE | 41 02 822 | | 8/1992 |
| DE | 41 02 882 | A1 | 8/1992 |
| DE | 42 04 384 | | 8/1993 |
| DE | 19748423 | | 2/1999 |
| DE | 10203514 | | 8/2003 |
| EP | 492152 | | 7/1992 |
| EP | 2055548 | | 5/2009 |
| JP | 08-308020 | | 11/1996 |
| JP | 08-322107 | | 12/1996 |
| JP | 09/163616 | | 6/1997 |
| JP | 10-037904 | | 2/1998 |
| JP | 2001/008309 | A | 1/2001 |
| JP | 2003-191762 | | 1/2005 |
| JP | 2007-069788 | | 3/2007 |
| JP | 2007-106385 | | 4/2007 |
| JP | 2007-107231 | | 4/2007 |
| WO | WO 92/01584 | | 2/1992 |
| WO | WO 2007-097819 | | 8/2007 |
| WO | WO 2009/009078 | A1 | 1/2009 |
| WO | WO-2009/049066 | | 4/2009 |

OTHER PUBLICATIONS

Office Action for U.S. Appl. No. 11/329,018, mail date Jun. 25, 2009, 16 pages.
Office Action for U.S. App. No. 11/329,018, mail date Dec. 18, 2008, 13 pages.
International Search Report and Written Opinion for International Application No. PCT/US2009/037664, dated Aug. 3, 2009, 6 pages.
AZD, Azure Dynamics, Electric Drive Solutions, AZD Force Drive, We drive a World of difference; available at least by May 30, 2008; 2 pages.
AZD, Azure Dynamics, Force Drive Electric Solutions, Force Drive Electric Vehicles Zero Emissions, website: http://www.azuredynamics.com/products/force-drive/traction-motors.htm; © 2008 Azure Dynamics Inc.; 2 pages.
AZD, Azure Dynamics, LEEP, Low Emission Electric Power System, AZD has one of the largest hybrid technology engineering teams in the world; available at least by May 30, 2008; 2 pages.
AZD, Azure Dynamics, Parallel Hybrid Electric Ford E450 Cutaway and Strip Chassis, available at least by May 30, 2008; 2 pages.
AZD, Azure Dynamics, Series Hybrid Electric Azure CitiBus, Our drive can make your difference; available at least by May 30, 2008; 2 pages.
Balance Hybrid Electric E450 Drive System Hybrid Trucks, © 2008 Azure Dynamics Inc.; website http://www.azuredynamics.com/products/balance-hybrid-electric.htm; 2 pages.
Blanco, S., "Odyne, Dueco will build PHV aerial lift truck," website: http://autobloggreen.com/2007/05/07/odyne-dueco-will-build-phev-aerial-lift-truck/, accessed on Jan. 3, 2009, 6 pgs.
U.S. Appl. No. 60/959,181, filed Jul. 12, 2007, Odyne Corporation.
Business Wire, Odyne Corp. Receives order for Twenty-five plug-in hybrid systems from Dueco, Inc., website: http://www.businesswire.com/portal/site/home/index.jsp?epi_menuItemID= 887566059a3ae . . ., accessed on Jan. 3, 2008, 3 pgs.
CitiBus Hybrid Electric StarTrans, CitiBus HD Senator; © 2008 Azure Dynamics Inc.; website: http://www.azuredynamics.com/products/citibus-hybrid-electric.htm; 2 pages.
Dueco, Hybrid Vehicle, TL50M Dueco's Plug-In Hybrid Electric Vehicle (PHEV); available at least by May 30, 2008; 1 page.
Dueco/Odyne Corporation, Partners in Green Technology for the Utility Industry, Hybrid Power, PHEV-Diesel Electric; available at least by May 30, 2008; website: www.dueco.com; 1 page.
Eaton, Freightliner® LLC, Daimler Chrysler Truck Group, M2 "Proof of Concept" HEV Utility Truck Specs; available at least by May 30, 2008; 2 pages.
Eaton, Hybrid Power Systems, Roadranger®, Eaton's Medium-Duty Hybrid Electric System provides up to 60% fuel savings and significantly reduces emissions as compared to a conventional drivetrain.*; © 2006 Eaton Corporation; website at www.roadranger.com.; 2 pages.
Green Car Congress, "Nissan Adds Diesel Hybrid and CNG Models to Atlas H43 Lineup," website: http://www.greencarcongress.com/2007/09/nissan-adds-die.html; accessed on Jun. 23, 2009, 2 pgs.
Hodges, Susan L., Is There a Hybrid in Your Future?; website: http://www.lmtruck.com/articles/petemplate.aspx?storyid=116; accessed on Jun. 6, 2008; 6 pages.
Hybrid Electric Vehicles LEEP Systems/Azure Dynamics; LEEP Systems/Freeze/Lift; © 2008 Azure Dynamics Inc.; website: http://www.azuredynamics.com/products/leep-system.htm; 2 pages.
HyPower by Terex, "Low Carbon Footprint, Plug-In Power Hybrid System," Copyright © 2009 Terex Corporation, 2 pgs.
International Search Report and Written Opinion for International Appl. No. PCT/US2008/079376, mail date Apr. 9, 2009, 9 pgs.
International Search Report and Written Opinion for International Appl. No. PCT/US08/08442, mail date Sep. 26, 2008, 7 pgs.
Isuzu, "Introduction of ELF Diesel Hybrid," website: http://www.isuzu.co.jp/world/technology/randd/project6/01.html; accessed on Nov. 1, 2007, 2 pgs.
Isuzu; "Low Pollution Alternative Fuel Vehicles," website: http://www.isuzu.co.jp/world/technology/low/index.html, accessed on Jun. 22, 2009, 3 pgs.
Ogando, Joseph; Hydraulic Powertrains Propel These Hybrid Trucks; website: http://www.designnews.com/article/CA6451735.html?nid=2874#_self; Design News, Jun. 13, 2007; 5 pgs.
Palumbo, Anthony J.; Bloomfield, Aaron, Major, Jeff; Ultracapacitor Based "Hybrid Booster Drive®"; Original Aug. 2003 (Revised Jun. 2004); 16 pages.
Powderly II, H.E., Long Island Business News, "Odyne to ship 25 plug-in systems to Dueco Inc.," dated Dec. 20, 2007, website: http://www.libn.com/breakingnews.htm?articleID=9497 accessed on Jan. 3, 2008, 2 pgs.
ThomasNet, "Aerial lift truck delivers plug-in hybrid functionality," website: http://news.thomasnet.com/fullstory/535299, accessed on Jan. 3, 2008, 4 pgs.
Vasilash, G., "Power Trains 2005, Hybrid Powertrains: The Two-Mode Approach," website: http://www.autofieldguide.com/articles/article_print1.cfm, accessed on Jun. 24, 2009, 3 pgs.
Vehicle Technology.org, Advanced GM Allison Two-Mode Parallel Hybrid Technology Ready for Europe; website: http://www.vehicletecnology.org/vt2007/36.html; accessed on Jun. 6, 2008; 3 pages.
Vehicle Technology.org, Advanced GM Allison Two-Mode Parallel Hybrid Technology Ready for Europe; website: http://www.vehicletecnology.org/vt2007/37.html; accessed on Jun. 6, 2008; 3 pages.
Vehicle Technology.org, Advanced GM Allison Two-Mode Parallel Hybrid Technology Ready for Europe; Energy storage system (ESS); website: http://www.vehicletecnology.org/vt2007/38.html; accessed on Jun. 6, 2008; 3 pages.
Notice of Allowance for U.S. Appl. No. 11/329,018, mail date Jun. 25, 2010, 7 pages.
International Search Report and Written Opinion for International Appl. No. PCT/US2009/066151 dated Jul. 15, 2010, 10 pages.
Notice of Allowance for U.S. Appl. No. 11/312,803, mail date Jun. 2, 2008, 7 pages.
Notice of Allowance for U.S. Appl. No. 11/315,927, mail date Sep. 29, 2008, 7 pages.
Notice of Allowance for U.S. Appl. No. 11/322,024, mail date Nov. 15, 2007, 6 pages.
Office Action for U.S. Appl. No. 11/312,803, mail date Dec. 14, 2007, 8 pages.
Office Action for U.S. Appl. No. 11/315,927, mail date Aug. 19, 2008, 15 pages.
Office Action for U.S. Appl. No. 11/315,927, mail date Nov. 21, 2007, 19 pages.

(56) References Cited

OTHER PUBLICATIONS

Office Action for U.S. Appl. No. 11/322,024, mail date May 29, 2007, 9 pages.
Office Action for U.S. Appl. No. 12/284,612, mail date Mar. 16, 2011, 11 pages.
Office Action for U.S. Appl. No. 12/316,494, mail date Dec. 1, 2009, 15 pages.
Office Action for U.S. Appl. No. 12/316,494, mail date Jun. 9, 2009, 17 pages.
Supplementary European Search Report for European Patent Application No. 08837311.3, mail date Sep. 1, 2011, 8 pages.
Communication and Supplementary European Search Report for Application No. EP08794431, mail date May 24, 2011, 7 pgs.
Office Action for U.S. Appl. No. 12/217,407, mail date Jun. 21, 2011, 10 pages.
Office Action for U.S. Appl. No. 11/329,018, mail date Dec. 18, 2009, 13 pages.
Notice of Allowance for U.S. Appl. No. 11/329,018, mail date Jun. 25, 2010, 7 pgs.
Office Action for U.S. Appl. No. 12/217,407, mail date Dec. 5, 2011, 10 pgs.
Office Action for U.S. Appl. No. 12/217,407, mail date Jun. 6, 2012, 8 pgs.
English translation of Japanese Office Action regarding Application No. 2010-516050, dated Oct. 9, 2012, 4 pages.
International Search Report and Written Opinion regarding PCT/US2012/029835, mail date Dec. 26, 2012, 7 pages.
Notice of Allowance for U.S. Appl. No. 12/710,247, mail date Nov. 26, 2012, 8 pages.
Cai, W., Chapter 25: Integrated Starter Alternator, Automotive Power Electronics and Motor Drives, 2005, 55 pages.
Isuzu ELF Diesel Hybrid description from Isuzu.com-different pages of complete report retrieved from web.archieve.org on various dates such as May 9, 2006, Sep. 5, 2006, Oct. 31, 2006 for the pages included with the Office Action for U.S. Appl. No. 12/130,888, 6 pages.
Li, Y. et al., Technology Overview: Power Management System for Plug-In Hybrid Electric Vehicles, OTT ID #1127, received Apr. 12, 2012, UWM Research Foundation, 2 pages.
Li, Y., Trip Based Optimal Power Management for Plug-In Hybrid Electric Vehicles, OTT ID #1127, dated Mar. 9, 2012, UWM Research Foundation, 20 pages.
Office Action for U.S. Appl. No. 12/217,407, mail date Dec. 18, 2009, 10 pages.
Office Action for U.S. Appl. No. 12/130,888, mail date Mar. 27, 2012, 18 pages.
Sherosky, F., Stop-start technology especially challenging for micro-hybrid engineers, Torque News, Jan. 1, 2011, 3 pages.
Supplementary European Search Report and Search Opinion for European Application No. 08837311, mail date Sep. 20, 2011, 9 pages.
Office Action for U.S. Appl. No. 12/710,247, mail date Apr. 10, 2012, 17 pages.
Computer Translation of Foreign Patent Document DE 40 24 384 A1, 14 pages.
Chinese Office Action for Application No. 200880105323.X, dated May 9, 2012, 7 pages.
English Translation of Office Action for Chinese Application No. 200880105323.X, dated May 9, 2012, 7 pages.
Non-Final Office Action for U.S. Appl. No. 12/710,247, mail date Aug. 27, 2012, 5 pages.
Office Action for European Application No. 08837311.3, mail date Jan. 9, 2013, 6 pages.
Office Action for Japanese Application No. 2010-529046, mail date Mar. 12, 2013, 2 pages.
Notice of Allowance for U.S. Appl. No. 12/284,612, mail date Sep. 30, 2011, 8 pages.
Office Action for European Application No. 08794431.0, mail date Oct. 29, 2012, 4 pages.
Office Action for U.S. Appl. No. 12/710,247, mail date Aug. 27, 2012, 5 pages.
Restriction Requirement for U.S. Appl. No. 13/629,533, mail date Feb. 28, 2013, 8 pages.
English Translation of Office Action for Chinese Application No. 200880117094.3, mail date Nov. 26, 2013, 2 pages.
Office Action for Japanese Application No. 2010-529046, mail date Dec. 10, 2013.
Office Action for U.S. Appl. No. 13/629,533, mail date Jun. 5, 2013, 9 pages.
English Translation of Chinese Office Action and Search Report for Application No. 2008801170943, dated Apr. 11, 2013, 14 pages.
Office Action for U.S. Appl. No. 12/130,888, mail date Jun. 26, 2013, 15 pages.
Third Office Action for Chinese Application No. 200880105323.X, mail date Jul. 26, 2013, 4 pages.
International Search Report and Written Report for Application No. PCT/US2013/036431, mail date Jul. 23, 2013, 12 pages.
2012 Honda Civic Hybrid v. 2011 Toyota Prius Five Comparison Test, www.edmunds.com/toyota/prius/2011/comparison-test.html, retrieved on Apr. 19, 2013, 9 pages.
Burke, A Deep Impression, Technology of Clean Air, Diesel Progress North American Edition, Jul. 2013, 3 pages.
Electric Hybrid, www.eaton.com/Eaton, ProductsServices/Truck/HybridPower/SystemsOveriview/El . . ., retrieved on Oct. 25, 2013, 1 page.
Integrated Motor Assist (IMA), http://wikicars.org/es/Integrated_Motor_Assist_(IMA), retrieved on Apr. 19, 2013, 7 pages.
Integrated Motor Assist, http://en.wikipedia.org/wiki/Integrated_Motor_Assist, retrieved on Oct. 7, 2013, 3 pages.
Office Action for U.S. Appl. No. 13/629,533, mail date Nov. 6, 2013, 7 pages.
Office Action for U.S. Appl. No. 13/812,723, mail date Sep. 4, 2013, 11 pages.
Office Action for Japanese Application No. 2010-516050, mail date Nov. 5, 2013, 6 pages.
Office Action on U.S. Appl. No. 12/130,888, Dated Feb. 19, 2014, 16 pages.
Office Action on U.S. Appl. No. 13/397,561, Dated Mar. 19, 2014, 9 pages.
Office Action on U.S. Appl. No. 13/812,723, Dated Feb. 26, 2014, 8 pages.

\* cited by examiner

PARALLEL HYBRID DRIVE SYSTEM UTILIZING POWER TAKE OFF CONNECTION AS TRANSFER FOR A SECONDARY ENERGY SOURCE

RELATED APPLICATIONS

This application is based in part upon provisional application Ser. No. 60/959,181 filed Jul. 12, 2007 and upon provisional application Ser. No. 61/126,118, filed May 1, 2008, and claims benefit under 35 United States Code section 119 (e) therefrom. These applications are incorporated by reference herein.

FIELD OF THE INVENTION

The present invention relates to a parallel hybrid propulsion system and controlling the system to use an electric motor to supplement drive power to wheels of a vehicle, when its internal combustion engine is driving the wheels and providing regenerative braking when the engine is not delivering power to the wheels, whereby the battery in the parallel hybrid drive system is recharged.

BACKGROUND OF INVENTION

A hybrid electric propulsion system is comprised of a multiplicity of power sources combined to provide traction power to the wheels of a vehicle. There are two major types of hybrid electric propulsion systems, Series and Parallel.

Series hybrid technology is based on all electric traction where electrical power is derived from an energy storage source such as a battery and/or capacitor where the energy storage device is charged from the AC mains, regenerative breaking and/or an on board electric generation device.

Parallel hybrid technology is based on the mechanical combination of a multiplicity of power sources in order to generate motive power to the wheels of a vehicle. In a parallel hybrid propulsion system, motive power is typically generated by an internal combustion engine (ICE) with additional mechanical power introduced into the motive system via an electric motor and/or other power source such as a pneumatic motor.

The unique technology being presented herein is based on the use of an automatic transmission which utilizes pressurized fluid and centrifugal force in order to change gears to increase the speed of a vehicle. Most automatic transmissions for medium and heavy-duty weight class vehicles (USDOT Class 6, 7, 8) have a Power Take Off (PTO) gear option.

A PTO gear is a direct connection to the power output of a transmission and is typically connected to the torque converter section of the transmission, which is a 1:1 ratio connection to the crankshaft of the ICE (once the torque converter has locked). The PTO gear is accessible via a cover plate on the external housing of a transmission. The PTO cover is removed and a PTO element is connected to the transmission's PTO gear.

The PTO element is a device having an input gear which meshes with the transmission's PTO gear and has and output shaft which can connect to a u-joint style driveshaft. The PTO output is typically used for driving auxiliaries such as air compressors, water pumps, and/or hydraulic pumps. PTO operation can be achieved in a stationary mode and/or while driving.

In the prior art patents of Gruenwald et al. (U.S. Pat. Nos. 6,484,830, 6,651,759, 7,004,273 and 7,252,165), there is described a hybrid system using ultracapacitors, which couples an AC induction motor through a PTO shaft to use regenerative braking energy to help propel the vehicle

OBJECTS OF THE INVENTION

An object of the invention is to deploy a parallel hybrid electric propulsion system utilized the exist components found on a Class 6, 7 or 8 truck or bus.

Another object of the invention is to provide bi-directional PTO operation.

Another object of the invention is the appropriate function of the parallel hybrid drive system that must include synchronized rotation between power sources.

Another object of the invention is the mitigation of the forces which are exerted on the internal components of the system during the above mentioned change.

Another object of the invention is the Vehicle Monitoring and Control System (VMCS) which oversees the various inputs to the hybrid system.

Another object of the invention is the use of an electric motor which is powered by a energy storage system, such as, for example, a battery system, to provide power under both driving conditions and stationary operation to an accessory system typically mounted to a conventional PTO.

SUMMARY OF INVENTION

In keeping with these objects and others which may become apparent, the present invention creates a parallel hybrid drive system utilizing the Power Take Off (PTO) connection on an automatic transmission, to act as transfer port for a secondary energy source for motive power and regenerative braking.

The vast majority of Class 6, 7,& 8 USDOT designated trucks and buses utilize transmission with a PTO gear option. The goal of the invention is to provide a parallel hybrid system which can be easily connected to some vehicles have a PTO in order to reduce fuel consumption.

An object of the invention is to deploy a parallel hybrid electric propulsion system utilized the exist components found on a Class 6, 7 or 8 truck or bus. Parallel hybrid drive systems which are currently being deployed by others require the use of a specialized transmission or a rework of the existing driveline at significant cost to the user. The invention discussed herein is a "add-on" parallel hybrid propulsion system which can be installed at any time during the usable life of a vehicle, at the factory or by a vehicle upfitter. The added benefit of the invention is through the use of mostly standard components, the maintenance costs, time and protocols are not changed dramatically.

Another object of the invention is to provide bi-directional PTO operation. As discussed earlier, the PTO output gear is connected to the engine crankshaft and relates to engine RPM directly. By applying power to the PTO input gear via an electric motor powered by a battery, the power output to the wheels is supplemented by the battery pack thus reducing the power supplied by the internal combustion engine in turn reducing fuel consumption. The electric motor can also provide drag or a negative force through the PTO element resulting in a method to stop the vehicle. The electric motor's negative force is used to charge the battery; during this phase, the electric motor functions as a generator. Those skilled in the art, refer to this as regenerative braking.

Another object of the invention is the appropriate function of the parallel hybrid drive system that must include synchronized rotation between power sources. In this case the power sources may be defined as a diesel internal combustion engine and an electric motor. The engine possesses the sole duty of delivering power to the transmission, while the motor will have the dual task of supplying power to the transmission and accepting power for charging (i.e. regenerative braking). The two different tasks cause the electric motor to change back and forth between working as the driver to being driven.

Another object of the invention is the mitigation of the forces which are exerted on the internal components of the system during the above mentioned change. The changing forces will cause the backlash within the components to reverse. For example the internal gear train of the PTO has specified tolerance values that allow backlash to occur. During operation any gear will receive contact from another gear on one side of each tooth only. The side at which the contact exists is determined by where the force is being exerted. As mentioned the forces in this system will reverse also causing the contact points to reverse. In order for the system to appropriately operate (to operate efficiency and not reduce life expectancy) all internal components must be able to accept the reversal of backlash. The potentially destructive bi-directional forces are mitigated through use of feedback control using the indexing function integrated into the electric motor assembly. Through the use of a "dampening" function within the software control algorithm the electric motor is able to reduce the potentiality harmful vibration caused by gear backlash and power transmission to the wheels.

Another object of the invention is the Vehicle Monitoring and Control System which oversees the various inputs to the traction system. The VMCS manages the following input/outputs in order to determine the amount and frequency of the power being applied to the PTO in order to maintain vehicle drivability and optimize overall efficiency:

Accelerator pedal position
Engine throttle position
Battery voltage
Vehicle speed
Torque request During driving, two specific modes are entered: 1) acceleration mode and 2) stopping mode. During acceleration mode the system routes power from the electric motor through transmission to the wheels. During stopping mode the electric motor provides resistance through the transmission to wheels in order to create electrical energy while stopping the vehicle (also called regenerative energy).

Others such as Gruenwald and Palumbo '165 used a AC induction motor which produces less torque than the motor (for a given weight and size)

The present invention has selected a permanent magnet motor which provides the additional torque for launch assist and regenerative breaking to make the system more effective. Palumbo makes a note that the 215 frame is the largest induction style motor which can fit, which limits the power of the machine utilized.

The present invention also alters the way the transmission shifts now by changing the CAN (vehicle network) commands for down/up shifting in order provide undetectable power blending from the electric motor and the engine through the transmission to the wheels.

In addition the transmission's torque converter is locked and unlocked. The variable state torque converter on the transmission types being used with the PTO Hybrid technology is to reduce the effective losses in the engine and torque converter during regenerative braking.

In this way, the vehicle monitoring and control system (VMCS) which incorporates the Driver Interface Node (DIN), Auxiliary Power Unit Controller (APUC), Charge Port Interface (CPI), Battery Management System (BMS), and the Master Events Controller (MEC) as well as other subsystems oversees control and changeover between operating modes as well as the details of power blending, shift control, torque converter locking and unlocking, damping control, and safety aspects of regenerative braking in the midst of anti-lock or stability control events.

Therefore, the vehicle power drive system of the present invention includes an internal combustion engine connected through a transmission to drive wheels of the vehicle. The transmission has a power take off (PTO) and PTO output gear. A parallel hybrid drive system, which is connected to the PTO includes an electric motor, an energy storage system (such as, for example, a battery system) and a vehicle monitoring and control system (VMCS). The electric motor is connected through a shaft to the PTO for bi-directional power flow. Typically, the electric motor operates an accessory device such as a hydraulic pump, an air compressor and a mounted accessory. The energy storage system is connected to the electric motor for sending and receiving electric power. The vehicle monitoring and control system (VMCS) has:

a) a first, accelerating mode for delivering electric power from the energy storage system to the electric motor, to provide drive power to the transmission for supplementing drive power being delivered by the engine to the wheels of the vehicle and, b) a second, deceleration mode having the electric motor receive shaft power from the PTO while acting as a generator, to provide regenerative braking and recharging the energy storage system when the engine is not delivering power to the wheels, wherein further the PTO can be disengaged from the transmission, allowing the electric motor to freely provide power to the aforesaid accessory device from the energy storage system.

The PTO is connected to a PTO output gear in the transmission. The aforesaid energy storage system preferably includes a battery pack, a battery charger for charging the battery pack using an outside electric power source, and a battery management system. The electric motor can have an optional auxiliary power take off, which can be disengaged when the VMCS is in the first mode. The VMCS optionally includes a dampening function to reduce vibration and gear backlash in the PTO when engaging either a switching mode, wherein the dampening function monitors the velocity and direction of the electric motor and the PTO output gear and adjusts the velocity and speed of the electric motor, thereby creating a closed-loop feedback loop to ensure smooth and efficient operation of the vehicle power drive system. The electrical motor can optionally be a permanent magnet motor providing additional torque during the aforesaid first accelerating mode and more regenerative power in the aforesaid second deceleration mode.

The VMCS preferably monitors accelerator pedal position, engine throttle position, battery voltage, vehicle speed, and/or torque request to determine the amount and frequency of power being applied to the PTO for maintaining vehicle drivability and optimize overall efficiency.

The hybrid system preferably includes a high voltage DC connection center between the energy storage system and an inverter for the electric motor to control electric power flow between the energy storage system, such as, for example, a battery system, and the electric motor.

The VMCS preferably has a third park/neutral mode in which the electric motor recharges the battery pack. Additionally, the VMCS preferably has a fourth, all-electric stationary mode with the engine shut down, in which the electric motor operates the auxiliary power take off.

In general, the vehicle power drive system of the present invention includes an internal combustion engine connected through a transmission to drive wheels of a vehicle, with the transmission having a power take off (PTO), wherein the drive system is retrofitted by the steps of:

a) connecting a parallel hybrid drive system to the PTO through a bi-directional power flow shaft, wherein the parallel hybrid drive system comprising an electric motor, a energy storage system, and an vehicle monitoring and control system (VMCS); and, b) the VMCS controls the parallel hybrid drive system to use the electric motor to supplement drive power to the wheels of the vehicle when the internal combustion engine is driving the wheels and provides regenerative braking when the engine is not delivering power to the wheels whereby the battery in the parallel hybrid drive system is recharged.

The retrofitting can also include the step of connecting the PTO to a torque converter in the transmission, as well as the step of recharging the energy storage system using an outside electric power source. The retrofitting can also include the step of withdrawing auxiliary power from the electric motor when the electric motor is recharging the energy storage system, or the step of disengaging the auxiliary power take off when the electric motor is delivering shaft power to the transmission.

Preferably, the VMCS uses a dampening function to reduce vibration in the PTO when switching between supplemental drive power and regenerative braking. The VMCS preferably also monitors accelerator pedal position, engine throttle position, battery voltage, vehicle speed, and/or torque request to determine the amount and frequency of power being applied to the PTO for maintaining vehicle drivability and to optimize overall efficiency.

The hybrid system can use a high voltage DC connection center between the energy storage system and an inverter for the electric motor, to control electric power flow between the energy storage system and the electric motor, which can also recharge the energy storage system during park or neutral position of the transmission.

The VMCS also provides a method for tuning the amount of power provided for launch assist and regenerative braking power applied in the forward and/or reverse direction, wherein further the VMCS has a tuning chart for the setting provided for each gear, the settings including pedal position vs. positive or negative torque applied, battery voltage vs. torque provided, torque provided vs. state of charge (SOC), and driver inputs including system disable.

The system also shifts through each gear, and the transmission provides a signal over the vehicle data network to, wherein the VMCS, in order to provide advanced notice of a shift event, and wherein further based upon this information and the pedal position, so that the VMCS can increase or decrease the power provided to the electric motor, allowing for smoother and more efficient shifting, thereby enhancing the vehicle ride and reducing fuel consumption.

The VMCS also preferably interfaces with any original equipment manufacturers (OEM) vehicle data system in order to eliminate or reduce regenerative braking based on anti-lock or traction control events.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF DRAWINGS

Figure 1:
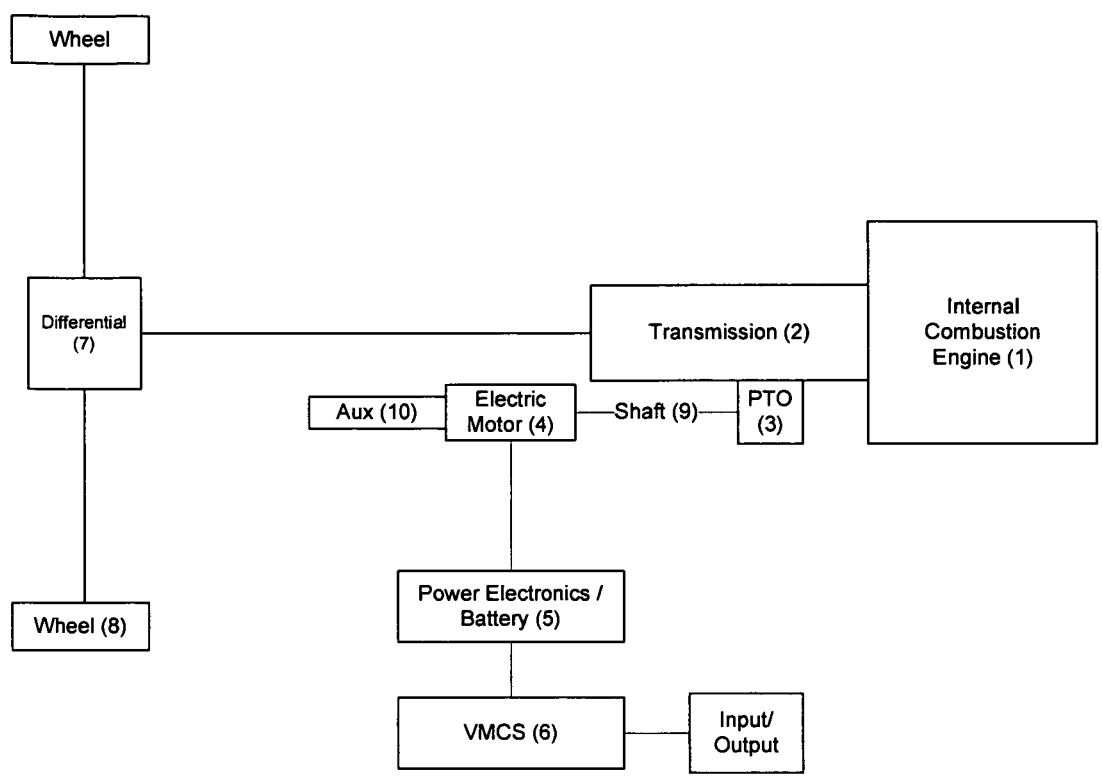
FIG. 1 is a high level block diagram showing the relationship between the major hardware elements of the invention.

FIG. 1 is a high level functional illustration of the invention. The illustration shows the interrelation of all the systems the proposed parallel hybrid propulsion system as affixed to a automatic transmission (2) powered by an internal combustion engine (1) in a Class 6, 7 or 8 bus or truck.

Elements (1), (2), (3), (7) and (8) are typical components found in a conventional Class 6, 7 or 8 truck or bus. These include the internal combustion engine (1), the transmission (2), a power take-off (PTO) element (3), wherein the transmission (2) communicates with a differential (7) driving wheels (8). Those skilled in the art understand the operation of these components and how they interact with each other under typical driving conditions.

The mechanical portion of the invention is illustrated in the elements including PTO device (3), electric motor (4), power electronics/battery (5), Vehicle Monitoring and Control System (VMCS) (6) and an auxiliary device (10), such as a compressor. The PTO element (3) is connected to an electric motor (4) with a short driveshaft (9). The shaft (9) can transmit power into or out of the PTO element (3). The electric motor (4) is powered by a power electronics/battery system (5), also a bi-directional system which can provide power to, or accept power from the electric motor (3) which is acted on mechanically via the PTO (3).

The Vehicle Monitoring and Control System (VMCS) (6) oversees the operation of the power electronics/battery system (5) by monitoring the inputs described above along with providing output data to the driver and/or other on-board vehicle systems.

An optional auxiliary device, (1) such as a compressor (10), can be mounted on the electric motor end shaft. These auxiliary systems can include a variety of rotating machines used to transmit fluids and/or power via the PTO.

OPERATIONAL MODES

Figure 2:
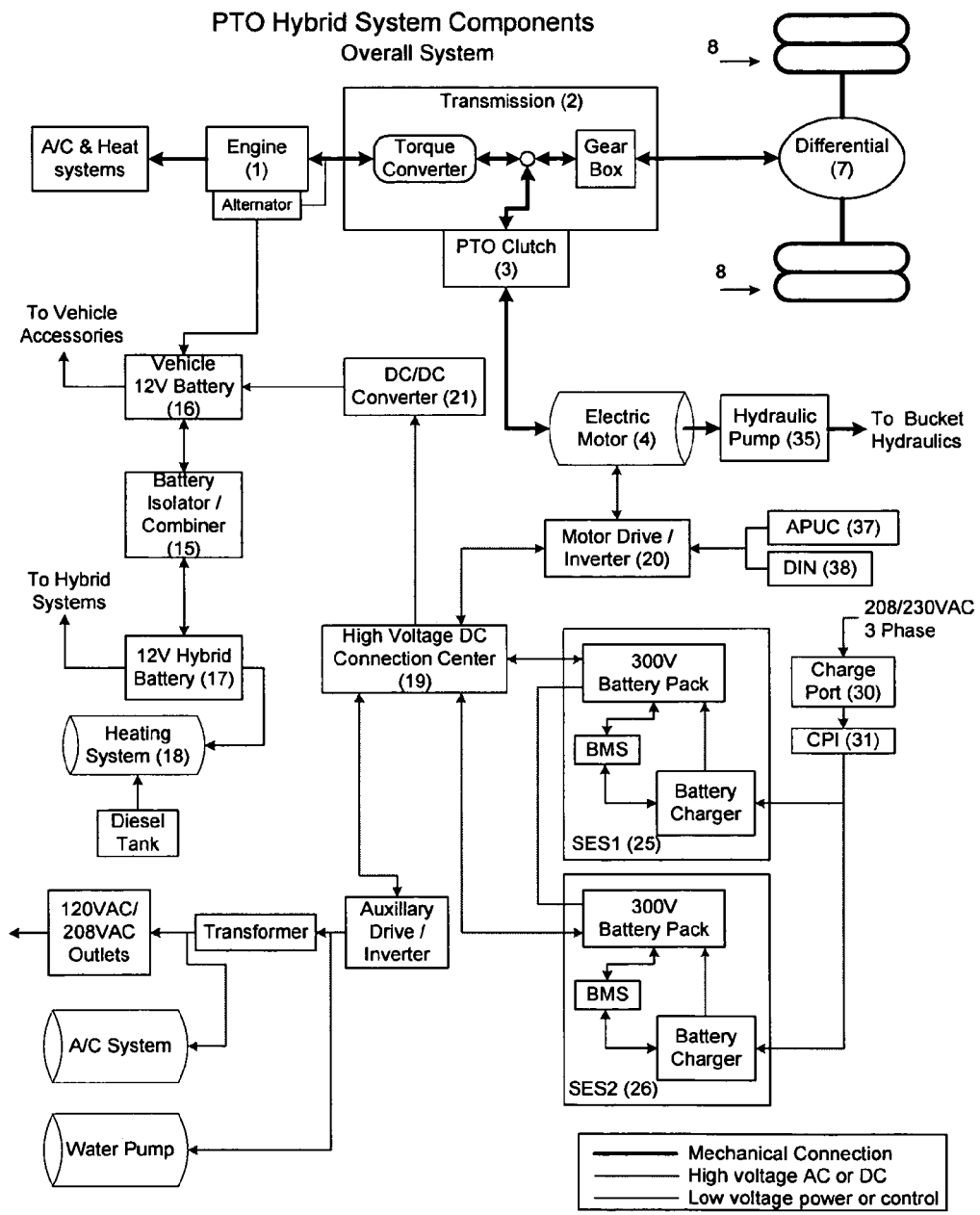
FIG. 2 is a detailed block diagram of the components and subsystems of the entire vehicle system of this invention.
Figure 3:
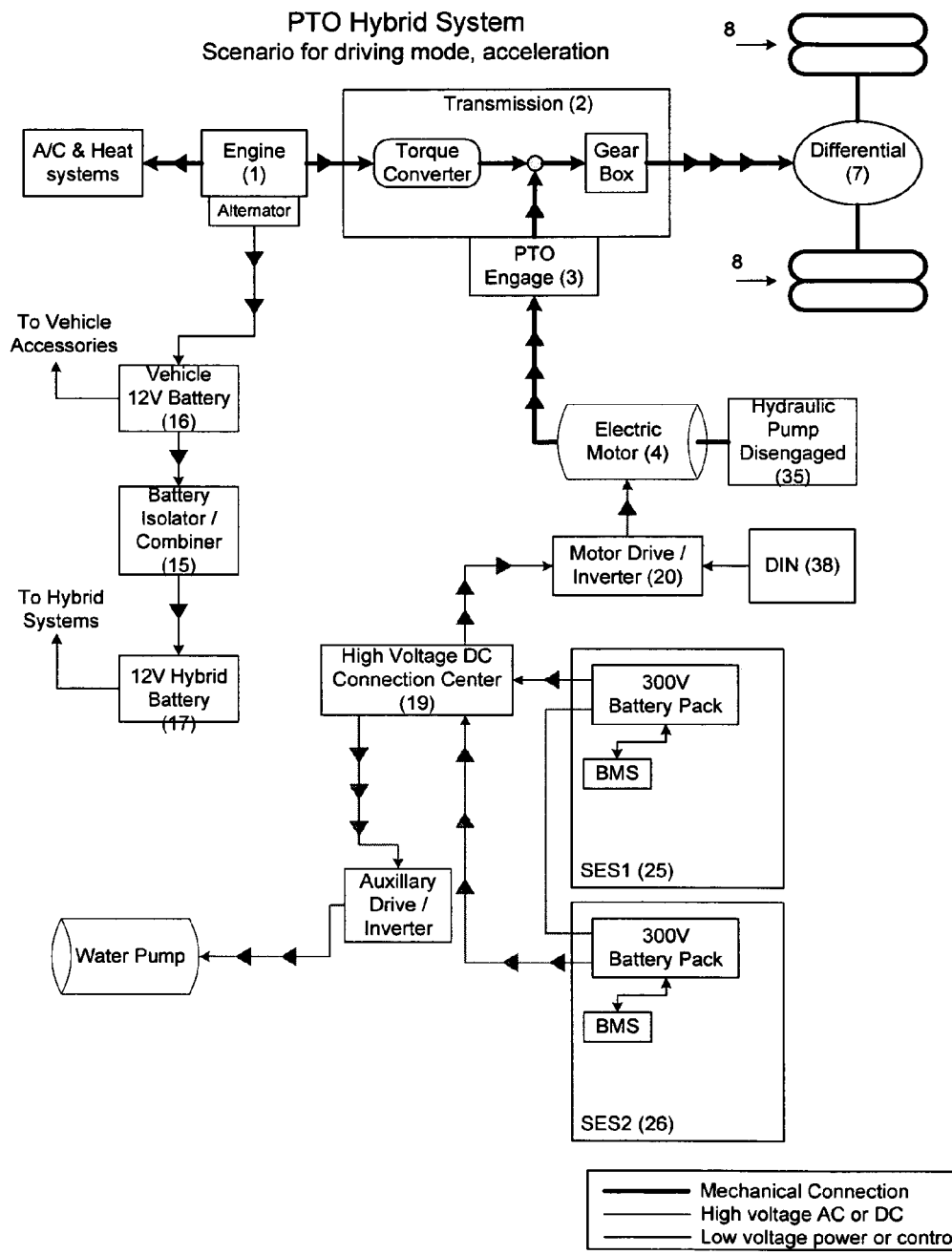
FIG. 3 is a diagram showing only those blocks used during vehicle acceleration along with arrows indicating power flows.
Figure 5:
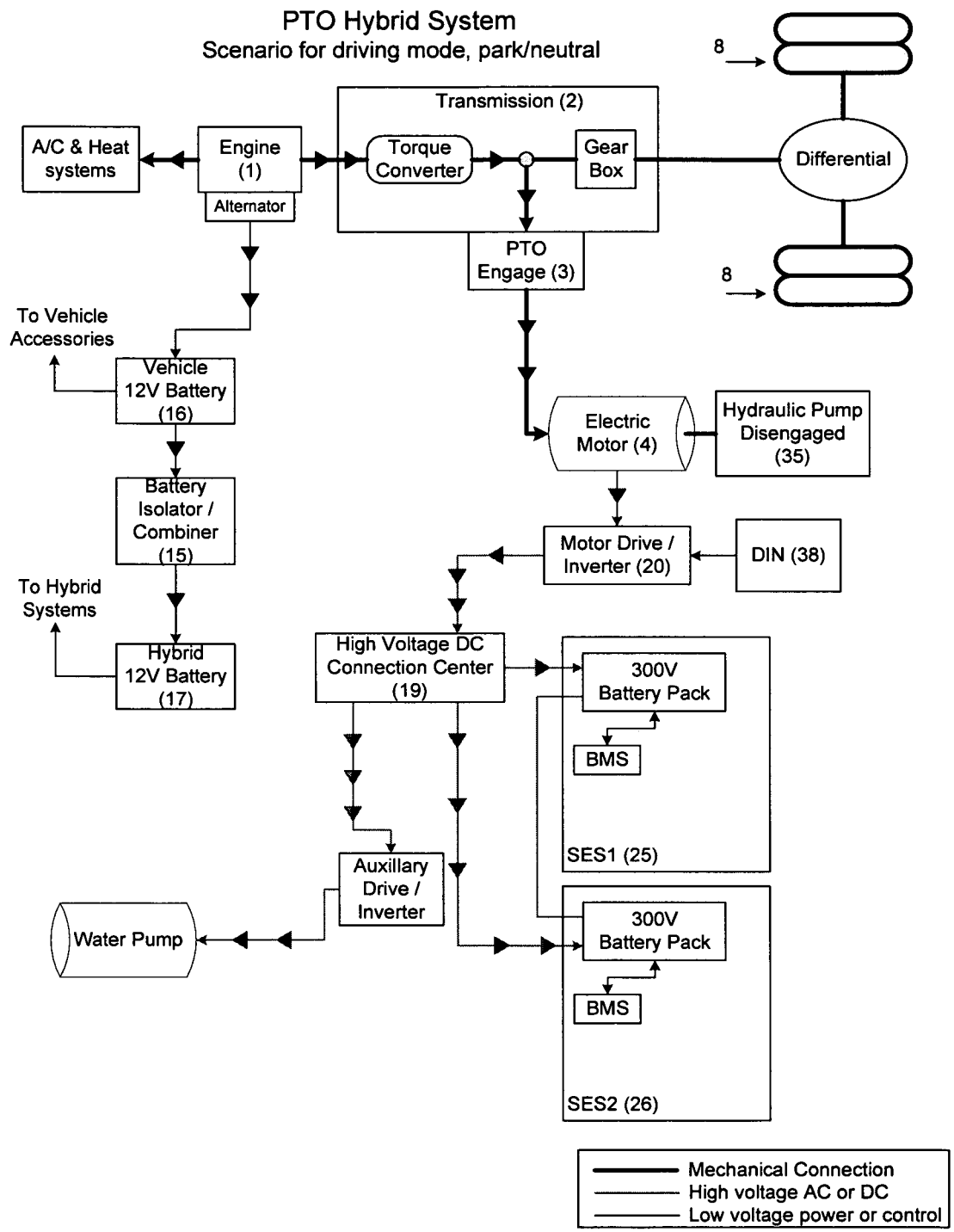
FIG. 5 is a diagram showing the blocks used in the driving mode of "park/neutral" with arrows showing possible power flow paths.
Figure 6:
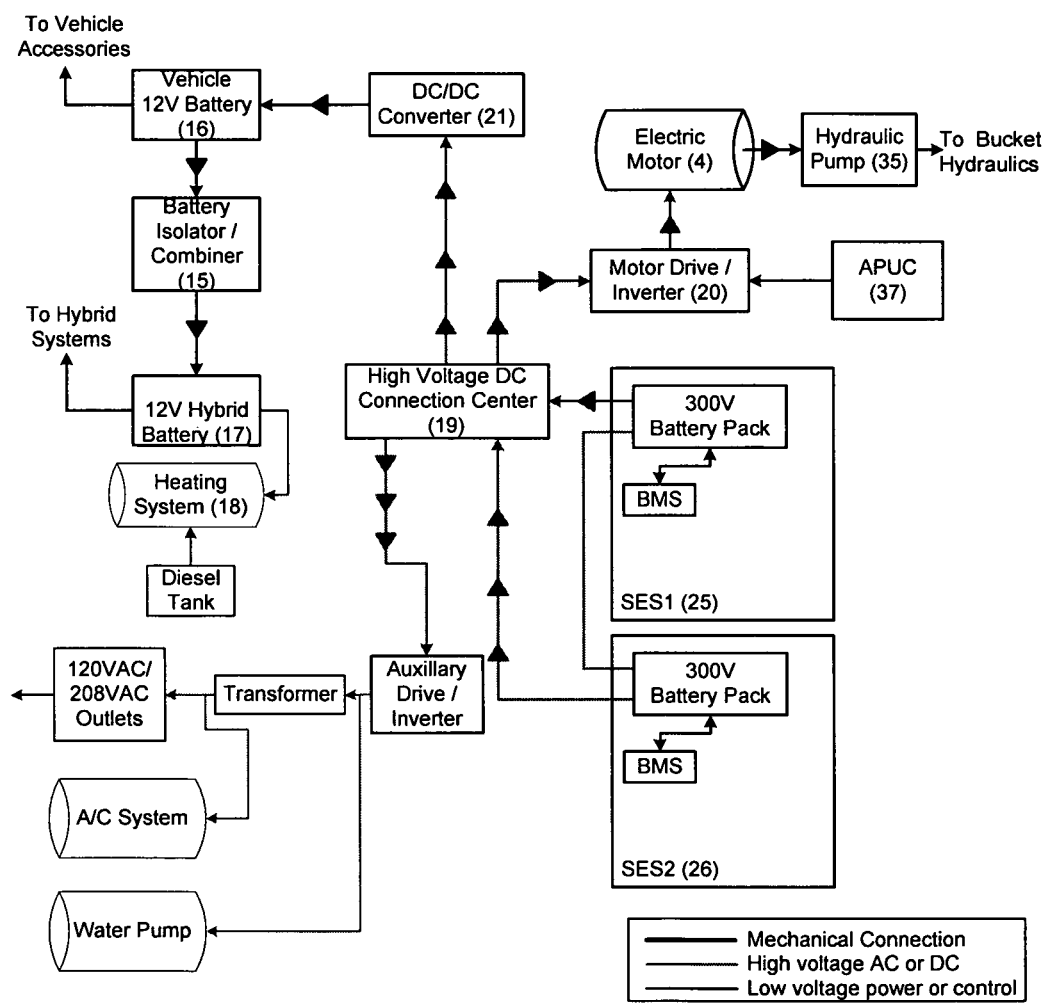
FIG. 6 is a diagram showing the blocks involved in the support of an all-electric stationary mode also indicating power flow directions via arrows.
Figure 7:
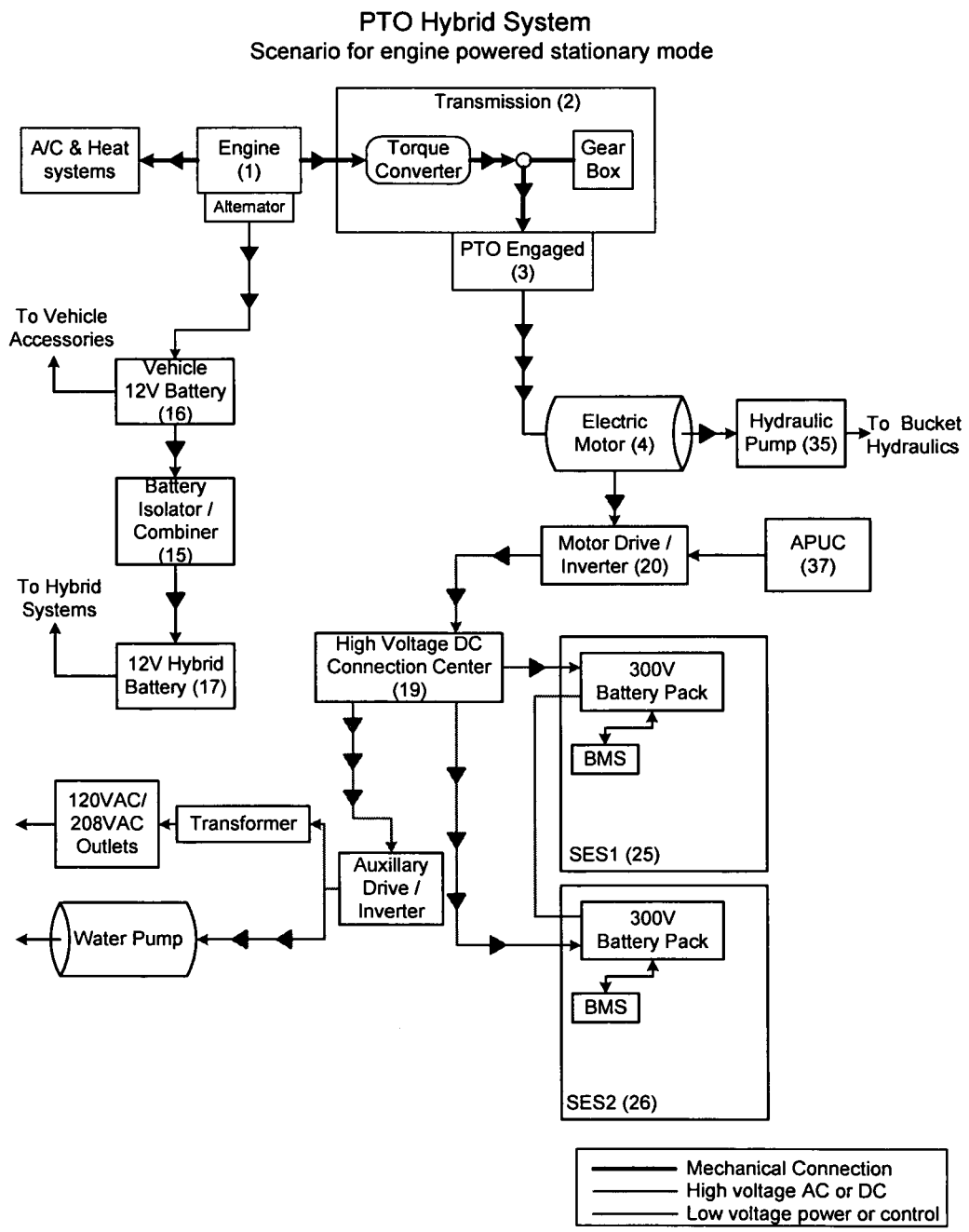
FIG. 7 is a diagram showing the elements involved in supporting an engine powered stationary mode indicating power flow directions.
Figure 8:
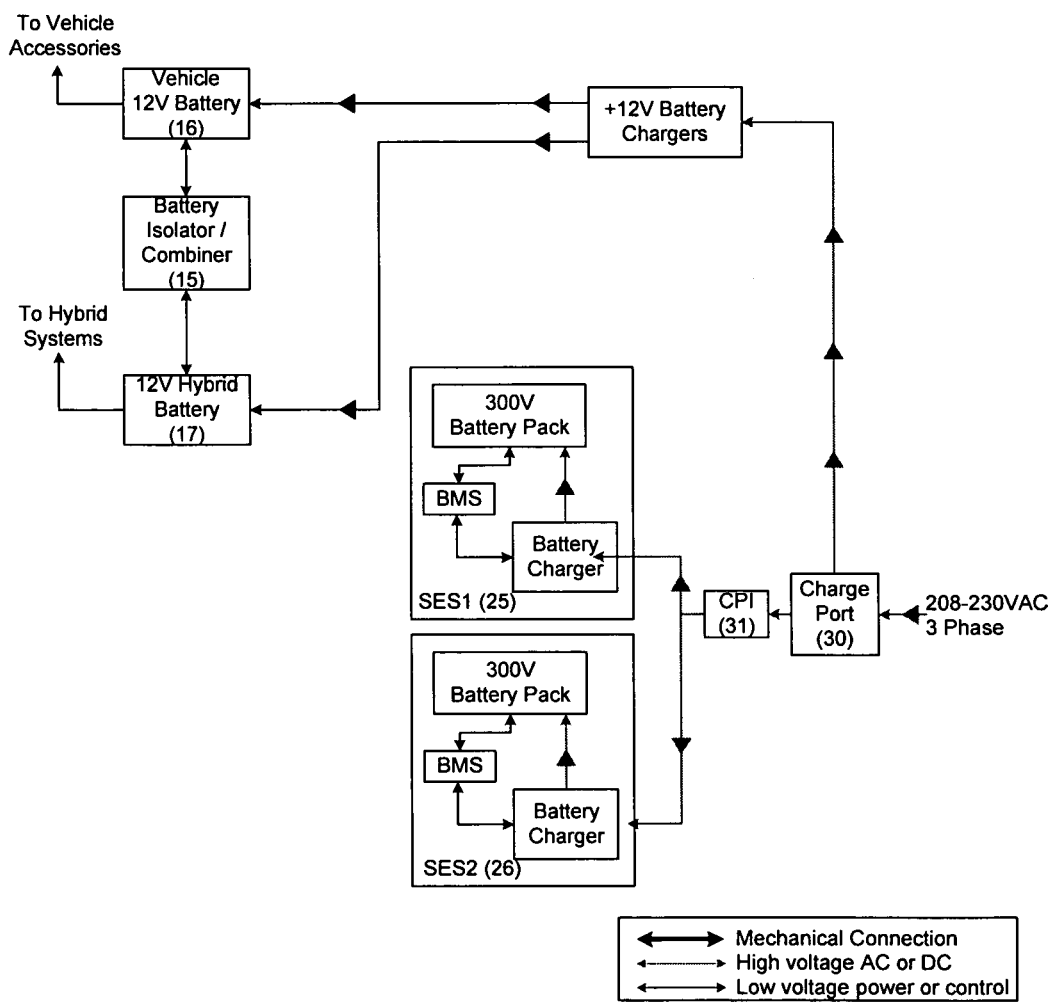
FIG. 8 is a diagram showing the blocks and power flows involved in the plug-in charging mode of the PTO Hybrid System of this invention.

The following diagrams shown in FIGS. 2-8 are illustrations of the power flow in each of the operational modes that the PTO Hybrid can be operated within:

FIG. 2 is an Overall system diagram.
FIG. 3 is a Driving mode during acceleration
FIG. 4 is a Driving mode during deceleration FIG. 5 is a Driving mode during park/neutral FIG. 6 is a Stationary mode during an all electric operation FIG. 7 is a Stationary mode during engine operation FIG. 8 is a Plug in mode during battery charging The Diagrams of FIGS. 3-8 illustrate the flow of mechanical energy, electrical energy, controls power and control logic within each of the operational modes.

FIG. 2 shows all of the major subsystems and elements used in PTO hybrid system of this invention. Most of the blocks shown are self-explanatory, however some may need elaboration. Note the "battery isolator/combiner" (15) on the left center; this controls connections between the vehicle battery (16) and a separate 12V battery (17) of the present invention which operates control systems as well as a "Heating System" (18). The central block, "High Voltage DC Connection Center" (19) has 3 connections; to the inverters (20) which convert DC from the battery packs to AC to operate the PM motor, and to the DC to DC converter (21) which steps the 600 VDC down to 12V for typical vehicle loads including connections to both 300V battery packs, SES1 (25) and SES2 (26) with their own local management systems and chargers. The AC charge port (30) on the right connects through charge port interface (31) (CPI) to both battery chargers. Note that the "Electric Motor" (4) which is used through the "PTO clutch" (3) for both acceleration and regenerative braking also powers a "Hydraulic Pump" (35) for bucket hydraulics. Auxiliary power unit controller (37) ("APUC") and driver interface node (38) (DIN) provide the power requirement to the Motor/Drive Inverter motor based on the accelerator pedal position and the power required during stationary mode operation respectively, with the "Motor Drive/Inverter" (20) which in turn provides electrical energy to the electric motor (4).

In FIG. 3, during the acceleration mode, power flows from both 300V battery packs, through the high voltage DC connection center (19), and the motor drive/inverter (20) to the electric motor (4) which drives the wheels (8) through its PTO entry point blending its power with that from engine (1). This launch assist is controlled by demand as well as the charge status of battery packs SES1 (25) and SES2 (26); it recycles energy gathered during braking to reduce fuel consumption and pollution.

Figure 4:
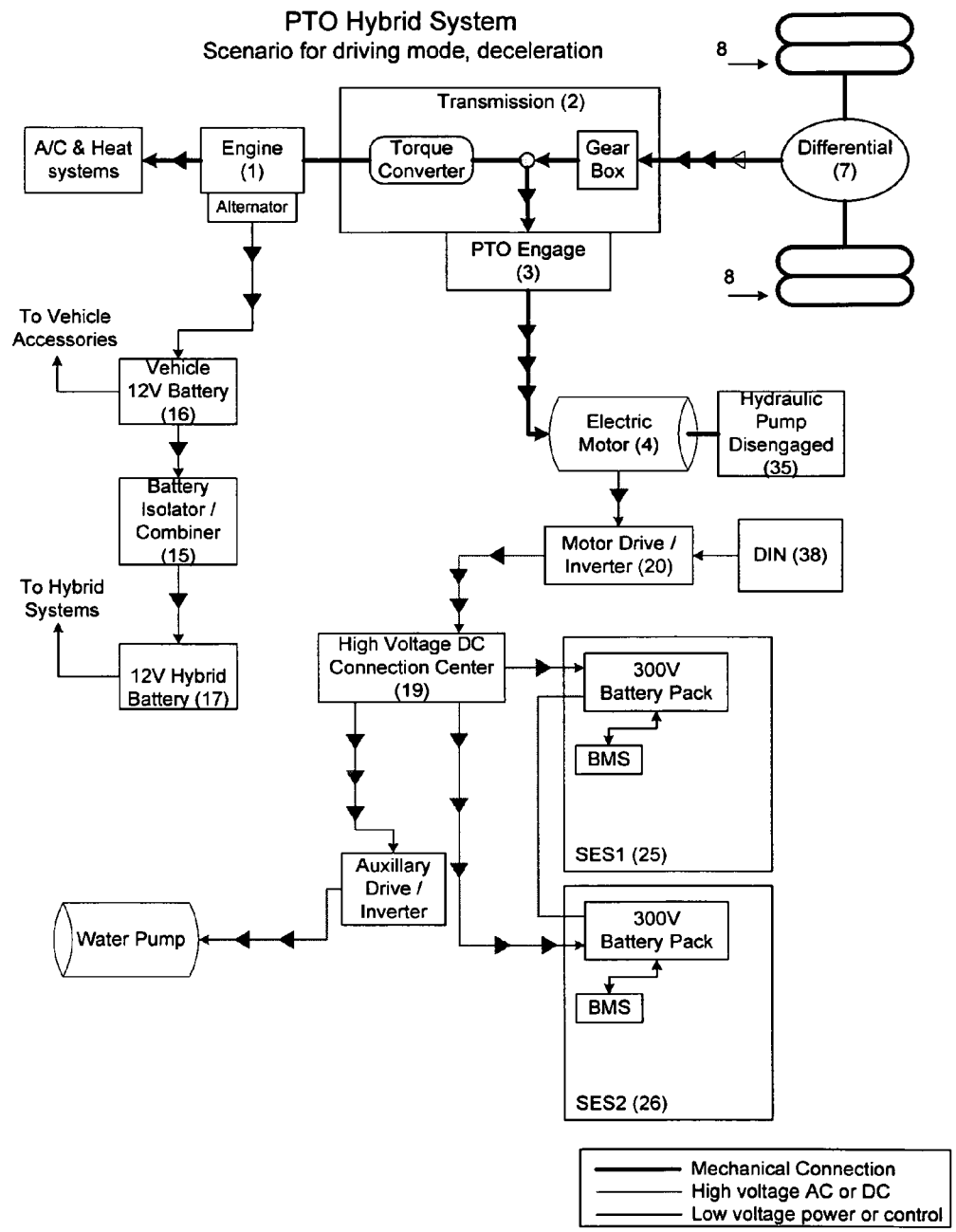
FIG. 4 is a diagram showing only those blocks used during vehicle deceleration including arrows to show power flow directions.

In contrast, in FIG. 4 during the deceleration mode, mechanical power flows from the differential (7) and gear box through the PTO (3), spinning the electric motor (4) as a generator to charge up both 300V battery packs through the motor drive/inverter (20) and the high voltage connection center (19). Thus energy which would have been wasted as heat in the brakes is recovered for later use.

FIG. 5 shows a typical operation while the vehicle is in "Park/Neutral" with the engine (1) running whereby engine power can be used to spin the electric motor (4) through the PTO (3) as a generator to top up both 300V battery packs and/or power the auxiliary drive. Note that in this mode the hydraulic pump (35) is disengaged from the electric motor (4).

FIG. 6 shows activity which can be supported by the PTO hybrid system of this invention while the vehicle is parked with the engine (1) off. In this mode, no site pollution or emissions are generated, and engine noise is absent. All power is provided from the two 300V battery packs. This all-electric mode can power bucket hydraulics, auxiliaries, and charging of vehicle 12V battery (16) as well as a 12V battery of the present invention through a DC/DC converter (21). The bold power arrows show the flow paths.

FIG. 7 shows the power flow for the engine-driven counterpart stationary mode. In this mode all power is derived from the engine (1), and the 300V battery packs can be recharged via engine power. This mode could be used briefly until the 300V batteries are charged if they had been depleted at a work site in all-electric mode. However, this mode can also supply bucket hydraulics since the motor (4), while spun by the engine (1) as a generator to charge the 300 V battery packs, is also shaft-connected to the hydraulic pump (35).

FIG. 8 is a diagram showing the connections for plug-in charging at a charging station. 12V battery chargers not part of the vehicle system are used to charge the two 12V batteries, while the chargers built into 300V packs SES1 (25) and SES2 (26) are used to charge those high voltage packs.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. In a vehicle comprising an internal combustion engine connected through an automatic transmission to drive wheels of the vehicle, the automatic transmission having a power take off (PTO), a first end of the PTO being coupled to the automatic transmission, a parallel hybrid drive system comprising:

an electric motor, an energy storage system and a vehicle monitoring and control system (VMCS); and wherein the electric motor is connected through a short drive shaft to a second end of said PTO for bi-directional power flow, the electric motor being coupled to an accessory device, the accessory device being a rotating machine for transmitting fluid in response to rotation, the accessory device being attached to an end of the short drive shaft, the energy storage system connected to the electric motor for providing and receiving electric power to and from the electric motor, the vehicle monitoring and control system (VMCS) having a first, accelerating mode for delivering the electric power from said energy storage system to said electric motor to provide mechanical power through the PTO to said automatic transmission for supplementing the mechanical power from the internal combustion engine to the wheels of the vehicle and a second, deceleration mode for having said electric motor receive the mechanical power from the automatic transmission through the PTO while acting as a generator to provide regenerative braking and recharging the energy storage system, wherein the accessory device can be powered by rotation of the short drive shaft by the electric motor or by the PTO, wherein the vehicle monitoring and control system (VMCS) has a third, stationary mode for delivering power to the electric motor to rotate the short drive shaft for powering the accessory device in accordance with a power requirement during the third, stationary mode, wherein the automatic transmission comprises a torque converter and a gear box, the first end of the PTO being coupled between an input of the torque converter and the gear box, the torque converter operating in a locked state and at least one unlocked state, the first end being in a 1 to 1 ratio connection with a crankshaft of the internal combustion engine when the torque converter is in the locked state, wherein the torque converter operates in the at least one unlocked state during the second, deceleration mode to reduce losses.

2. The parallel hybrid drive system as in claim 1, wherein the accessory device is selected from a group consisting of a hydraulic pump, an air compressor and a mounted accessory, and the PTO being disengaged from the transmission in the third, stationary mode.

3. The parallel hybrid drive system of claim 1 wherein the PTO is connected to a PTO output gear in said transmission at the first end.

4. The parallel hybrid drive system of claim 1 wherein the energy storage system comprises a battery pack, a battery charger for charging said battery pack using an outside electric power source, and a battery management system.

5. The parallel hybrid drive system of claim 1 wherein the electric motor has an auxiliary power take off.

6. The parallel hybrid drive system of claim 5 wherein the auxiliary power take off is disengaged when said VMCS is in the first, accelerating mode.

7. The parallel hybrid drive system of claim 6 wherein said VMCS is software controlled and includes a dampening function to reduce vibration and gear backlash in the PTO when engaging either the first mode or the second mode, said dampening function monitoring a velocity of the electric motor and the PTO and adjusting the velocity of the electric motor, thereby creating a closed-loop feedback loop to ensure smooth and efficient operation of the vehicle, wherein the closed-loop feedback loop uses an indexing function integrated with an assembly of the electric motor to mitigate destructive bi-directional forces.

8. The parallel hybrid drive system of claim 1 wherein the VMCS monitors accelerator pedal position, engine throttle position, battery voltage, vehicle speed, and torque request to determine amount and frequency of power being applied to the PTO for maintaining vehicle drivability and optimize overall efficiency.

9. The parallel hybrid drive system of claim 8 further comprising a DC connection center between the energy storage system and an inverter for the electric motor for controlling electric power flow between the energy storage system and the electric motor.

10. The parallel hybrid drive system of claim 9 wherein the VMCS has a first park/neutral mode wherein the electric motor recharges a battery pack of the energy storage system using the power provided by the PTO; or wherein the VMCS has a second park/neutral mode wherein the electric motor recharges the battery pack using the power provided by the PTO while also operating the accessory.

11. The parallel hybrid drive system of claim 10 wherein said VMCS has an all-electric stationary mode with the internal combustion engine shut down, wherein the electric motor operates an auxiliary power take off in the all-electric stationary mode.

12. A hybrid drive system connected to a shaft of a PTO, the shaft being on a first interface of the PTO, a second interface of the PTO being associated with an automatic transmission of a vehicle, wherein the automatic transmission includes a torque converter and a gear box and the second interface is provided between an input of the torque converter and the gear box, the hybrid drive system comprising:
an electric motor in mechanical communication with the shaft;
an energy storage system in electric communication with the electric motor; and
a fluid pump in mechanical communication with the electric motor, wherein the fluid pump is attached to an end shaft of the electric motor, wherein the electric motor and the fluid pump are associated with the first interface of the PTO, wherein the electric motor is capable of providing mechanical power derived from electric energy in the energy storage system to said automatic transmission via the PTO and the electric motor is capable of receiving the mechanical power from the automatic transmission via the PTO to provide the electrical energy to the energy storage system, wherein the fluid pump can be powered via the electric motor or via the PTO.

13. In a vehicle comprising an internal combustion engine connected through an automatic transmission to drive wheels of the vehicle, the automatic transmission having a power take off (PTO), a method of retrofitting the vehicle with a hybrid drive system comprising steps of:
connecting an electric motor and a rotating machine for transmitting fluids to the PTO via a drive shaft, wherein the electric motor is part of the hybrid drive system comprising the electric motor and an energy storage system, the rotating machine being mounted on an end shaft of the electric motor, the drive shaft being attached to the PTO on a first end of the PTO, a second end of the PTO being attached to the automatic transmission; and
controlling the hybrid drive system to use the electric motor to supplement drive power to the wheels of the vehicle through the PTO and providing regenerative braking through the PTO, wherein the rotating machine can be powered by rotation of the electric motor powered by the energy storage system and can be powered by rotation of the PTO whereby said energy storage system in the hybrid drive system is recharged by the regenerative braking.

14. The method of claim 13 further comprising the step of connecting the PTO to a torque converter in the automatic transmission at the second end, wherein the torque converter is a variable state torque converter.

15. The method of claim 13 further comprising the step of recharging the energy storage system using an outside electric power source.

16. The method of claim 15 further comprising the step of withdrawing auxiliary power from the electric motor when the electric motor is recharging the energy storage system.

17. The method of claim 16 further comprising the step of disengaging auxiliary power take off when the electric motor is delivering power to the transmission through the PTO.

18. The method of claim 17 wherein a software controlled vehicle monitoring and control system (VMCS) uses a dampening function to reduce vibration in the PTO when switching between supplemental drive power and regenerative braking.

19. The method of claim 18 wherein said VMCS monitors accelerator pedal position, engine throttle position, battery voltage, vehicle speed, and torque request to determine amount and frequency of power being applied to the PTO for maintaining vehicle drivability and optimize overall efficiency.

20. The method of claim 19 wherein the hybrid drive system uses a 300V high voltage DC connection center between the energy storage system and an inverter for the electric motor for controlling electric power flow between the energy storage system and the electric motor.

21. The method of claim 20 wherein electric motor recharges said energy storage system during park or neutral position of the transmission.

22. The method of claim 19, wherein the VMCS, controls the launch assist using the electric motor based upon a charge status of the energy storage system and demand.

23. The method of claim 19, wherein the hybrid drive system shifts through each gear, the transmission providing a signal over a vehicle data network to the VMCS in order to provide advanced notice of a shift event, wherein said VMCS can increase or decrease the power provided to the electric motor in response to the signal and the pedal position, allowing for smoother and more efficient shifting, thereby enhancing the vehicle ride and reducing fuel consumption.

24. The method as in claim 19 wherein the VMCS further interfaces with an original equipment manufacturers (OEM) vehicle data system in order to eliminate or reduce regenerative braking based on anti-lock or traction control events.

\* \* \* \* \*